(12) United States Patent
Roberts et al.

(10) Patent No.: US 11,769,926 B2
(45) Date of Patent: Sep. 26, 2023

(54) TRACTION BATTERY HAVING A BATTERY CELL ARRAY USABLE WITH DIFFERENT BUSBAR MODULES AND METHOD OF ASSEMBLING SUCH A TRACTION BATTERY

(71) Applicant: Ford Global Technologies, LLC, Deraborn, MI (US)

(72) Inventors: Daniel Paul Roberts, Livonia, MI (US); Francisco Fernandez-Galindo, Canton, MI (US); Abdul Lateef, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 17/159,474

(22) Filed: Jan. 27, 2021

(65) Prior Publication Data
US 2022/0238950 A1 Jul. 28, 2022

(51) Int. Cl.
*H01M 50/269* (2021.01)
*H01M 50/507* (2021.01)
*H01M 50/204* (2021.01)
*H01M 50/249* (2021.01)
*H01M 50/512* (2021.01)

(52) U.S. Cl.
CPC ....... *H01M 50/269* (2021.01); *H01M 50/204* (2021.01); *H01M 50/249* (2021.01); *H01M 50/507* (2021.01); *H01M 50/512* (2021.01); *H01M 2220/20* (2013.01)

(58) Field of Classification Search
None
See application file for complete search history.

(56) References Cited

U.S. PATENT DOCUMENTS

| 9,005,801 | B2 | 4/2015 | Tonomura et al. | |
|---|---|---|---|---|
| 10,369,633 | B2 | 8/2019 | Choi et al. | |
| 2016/0372733 | A1* | 12/2016 | Benedict | H01M 50/227 |
| 2019/0027734 | A1* | 1/2019 | Guo | H01M 50/505 |
| 2019/0198845 | A1* | 6/2019 | Bae | H01M 50/505 |

FOREIGN PATENT DOCUMENTS

WO 2016132280 8/2016

\* cited by examiner

*Primary Examiner* — Carmen V Lyles-Irving
(74) *Attorney, Agent, or Firm* — David B. Kelley; Carlson, Gaskey & Olds, P.C.

(57) ABSTRACT

A traction battery assembly includes, among other things, a battery cell array having a plurality of individual battery cells. The battery cell array usable with a first busbar module having a first arrangement of busbars. The battery cell array is also usable with a second busbar module having a second arrangement of busbars. When the battery cell array is used with the first busbar module, the battery cell array is partitioned into a first number of groups of battery cells in parallel with each other. When the battery cell array is used with the second busbar module, the battery cell array is partitioned into a different, second number of groups of battery cells in parallel with each other.

20 Claims, 5 Drawing Sheets

TRACTION BATTERY HAVING A BATTERY CELL ARRAY USABLE WITH DIFFERENT BUSBAR MODULES AND METHOD OF ASSEMBLING SUCH A TRACTION BATTERY

TECHNICAL FIELD

This disclosure relates generally to a traction battery and, more particularly, to a traction battery having a battery cell array usable with different busbar modules having different arrangements of busbars.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include a plurality of arrays. Each array can include a plurality of individual battery cells.

With reference to prior art FIGS. 7A-7C, to provide a "2P" array where the battery cell array is partitioned into groups of two individual battery cells connected in parallel, a first type of busbar module (BBM) is used with a first type of array. To provide a "3P" array where the battery cell array is partitioned into groups of three individual battery cells connected in parallel, a different, second type of BBM is used with a different, second type of array. To provide "4P" array where the battery cell array is partitioned into groups of four individual battery cells connected in parallel, a third type of BBM is used with a third type of battery cell array. Thus, in the prior art, to provide a 2P array, 3P array, 4P array, three different types of battery cell arrays are required along with three different types of busbar modules.

SUMMARY

A traction battery assembly according to an exemplary aspect of the present disclosure includes, among other things, a battery cell array having a plurality of individual battery cells. The battery cell array usable with a first busbar module having a first arrangement of busbars. The battery cell array is also usable with a second busbar module having a second arrangement of busbars. When the battery cell array is used with the first busbar module, the battery cell array is partitioned into a first number of groups of battery cells in parallel with each other. When the battery cell array is used with the second busbar module, the battery cell array is partitioned into a different, second number of groups of battery cells in parallel with each other.

In another exemplary embodiment of the foregoing assembly, each group within the first number of groups includes a first number of battery cells in parallel, and each group within the second number of groups includes a second, different number of battery cells in parallel.

In another exemplary embodiment of any of the foregoing assemblies, each group within the first number of groups includes two battery cells in parallel, and each group within the second number of groups includes three battery cells in parallel.

In another exemplary embodiment of any of the foregoing assemblies, the first and second busbar modules each include a housing and a plurality of busbars.

In another exemplary embodiment of any of the foregoing assemblies, each of the battery cells within the battery cell array includes a positive and a negative terminal. A positive terminal of a first one of the battery cells is directly adjacent a negative terminal of a second one of the battery cells within the battery cells array. The first one of the battery cells is directly adjacent the second one of the battery cells within the battery cell array.

In another exemplary embodiment of any of the foregoing assemblies, the battery cells are disposed along an axis.

In another exemplary embodiment of any of the foregoing assemblies, the battery cell is usable with the first busbar module and the second busbar module without changing an orientation of the battery cells relative to each other.

In another exemplary embodiment of any of the foregoing assemblies, the battery cells each include terminals that are each electrically connected to busbars of the first arrangement of busbars when the battery cell array is used with the first busbar module.

In another exemplary embodiment of any of the foregoing assemblies, the terminals are welded to busbars of the first arrangement of busbars to electrically connect the terminals to the busbars.

In another exemplary embodiment of any of the foregoing assemblies, the terminals are spring biased against busbars of the first arrangement of busbars to electrically connect the terminals to the busbars.

Another exemplary embodiment of any of the foregoing assemblies includes a third busbar module and a first poke-yoke configuration. The third busbar module is a different type of busbar module than the first and second busbar modules. The first poke-yoke configuration permits coupling the first or the second busbar modules of the first type to the battery cell array, and blocks coupling of the third busbar module to the battery cell array.

In another exemplary embodiment of any of the foregoing assemblies, the battery cell array is a first battery cell array that is a first type of battery cell array. The assembly further includes a second battery cell array of a second type that is different than the first type of battery cell array and a second poke-yoke configuration. The second poke-yoke configuration permits coupling the third busbar module to the second battery cell array, and blocks coupling of the first and second busbar modules to the battery cell array.

A traction battery connecting method according to another exemplary aspect of the present disclosure includes, among other things, using a battery cell array with a first busbar module having a first arrangement of busbars. The battery cell array is also usable with a second busbar module having a second arrangement of busbars. The battery cell array includes battery cells. When the battery cell array is used with the first busbar module, the battery cell array is partitioned into a first number of groups of battery cells in parallel. When the battery cell array is used with the second busbar module, the battery cell array is partitioned into a different, second number of groups of battery cell arrays in parallel. Each group within the first number of groups includes a first number of battery cells in parallel, and each group within the second number of groups includes a second, different number of battery cells in parallel.

In another exemplary embodiment of the foregoing method, each group within the first number of groups includes two battery cells in parallel, and each group within the second number of groups includes three battery cells in parallel.

In another exemplary embodiment of any of the foregoing methods, each of the battery cells within the plurality of battery cell array includes a positive and a negative terminal. A positive terminal of a first one of the battery cells is directly adjacent a negative terminal of a second one of the battery cells. The first one of the battery cells is directly adjacent the second one of the battery cells within the battery cell array.

In another exemplary embodiment of the foregoing method the battery cell is usable with the first busbar module and the second busbar module without changing an orientation of the battery cells relative to each other.

Another exemplary embodiment of any of the foregoing methods includes, when the battery cell array is used with the first arrangement of busbars, electrically connecting busbars of the first arrangement of busbars to terminals of the battery cells by welding the terminals of the battery cells to busbars of the first arrangement of busbars.

Another exemplary embodiment of any of the foregoing methods includes, when the battery cell array is used with the first arrangement of busbars, electrically connecting busbars of the first arrangement of busbars to terminals of the battery cells by spring-biasing the terminals of the battery cells to busbars of the first arrangement of busbars.

A traction battery assembly according to yet another exemplary aspect of the present disclosure includes, among other things, a first busbar module having a first arrangement of busbars, a second busbar module having a second arrangement of busbars, and a battery cell array including a plurality of battery cells that are selectively electrically connected in a configuration selected from a group consisting of a first configuration using the first busbar module and a different, second configuration using the second busbar module.

In another example of the foregoing assembly, when the plurality of battery cells are electrically connected in the first configuration, the battery cell array is partitioned into a first number of groups of battery cells in parallel with each other, when the plurality of battery cells are electrically connected in the second configuration, the battery cell assembly is partitioned into a different, second number of groups of battery cells in parallel with each other.

A traction battery assembly according to another example of the foregoing assembly includes a battery cell array having a plurality of battery cells. The battery cell array is usable with a first busbar module having a first arrangement of busbars, The battery cell array is usable with a second busbar module having a second arrangement of busbars. Each of the battery cells within the battery cell array includes a positive terminal and a negative terminal. A positive terminal of a first one of the battery cells within the battery cell array is directly adjacent a negative terminal of a second one of the battery cells. The first one of the battery cells is directly adjacent the second one of the battery cells within the battery cell array.

In another example of the foregoing assembly, when the battery cell array is used with the first busbar module, the battery cell array is partitioned into a first number of groups of battery cells in parallel with each other. When the battery cell array is used with the second busbar module, the battery cell array is partitioned into a different, second number of groups of battery cells in parallel with each other.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery assembly for a traction battery can include a busbar module (BBM) having busbars that are electrically connected to battery cells within a battery cell array. This disclosure details a battery cell array that can be used with a first BBM or a second BBM. An arrangement of busbars within the first BBM is different than an arrangement of busbars within the second BBM. Changing the BBM used with the battery cell array is substantially all that is required to change the number of individual cells connected in parallel with one another within the battery cell array.

Figure 1:
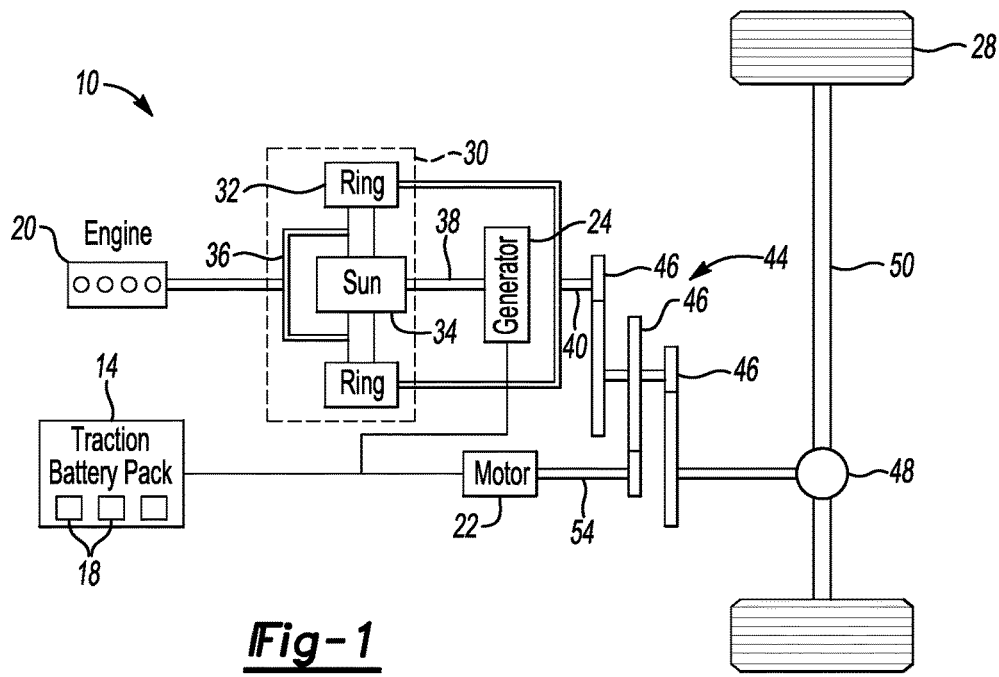
FIG. 1 illustrates a schematic view of an electrified vehicle powertrain.

Referring to FIG. 1, a powertrain 10 of a plug-in hybrid electric vehicle (PHEV) includes a traction battery pack 14 having a plurality of battery assemblies 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to traction battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery pack 14.

Figure 2:
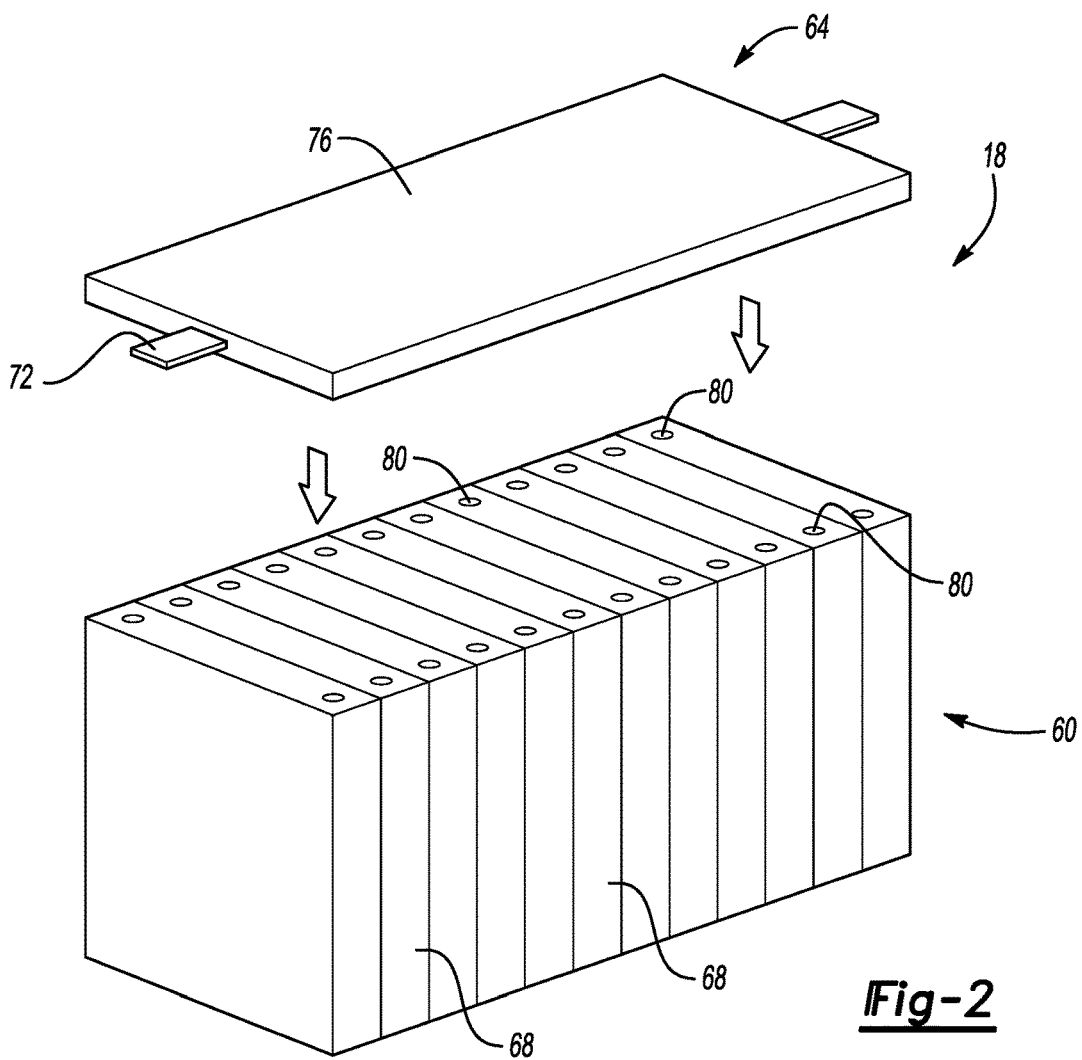
FIG. 2 illustrates a perspective view of a battery assembly from a traction battery of the powertrain of FIG. 1.

With reference now to FIG. 2, the battery assemblies 18 of the traction battery pack 14 each include a battery cell array 60 and a busbar module 64. The battery cell array 60 includes a plurality of individual battery cells 68. The BBM 64 includes a first arrangement 72 of busbars and a busbar housing 76 that holds the first arrangement 72

The example battery cell array 60 includes twelve individual battery cells 68, but other numbers of individual battery cells 68 could be used. The battery cells 68 are lithium ion cells in this example. In another example, the battery cells 68 could be pouch cells.

In the exemplary embodiment, the BBM 64 is positioned atop the battery cell array 60 to electrically connect the busbars of the first arrangement 72 to the battery cells 68. The busbars of the first arrangement 72 can be directly connected to terminals 80 of the individual battery cells 68. Welds, such as laser welds, can be utilized to secure the terminals 80 to the busbars of the first arrangement 72.

Alternatively, the terminals 80 could be spring terminals that are biased against the busbars of the first arrangement 72 when the BBM 64 is secured relative to the battery cell array 60. In such an example, when the BBM 64 is removed from the battery cell arrays 60, the spring terminals spring back. The BBM 64 could snap fit to the battery cell array 60 to hold the BBM 64 relative to the battery cell arrays 60 in a position where the busbars of the first arrangement 72 are pressing against the spring terminals. A person having skill in this art and the benefit of this disclosure could understand spring terminals and how to bias spring terminals.

Figure 3:
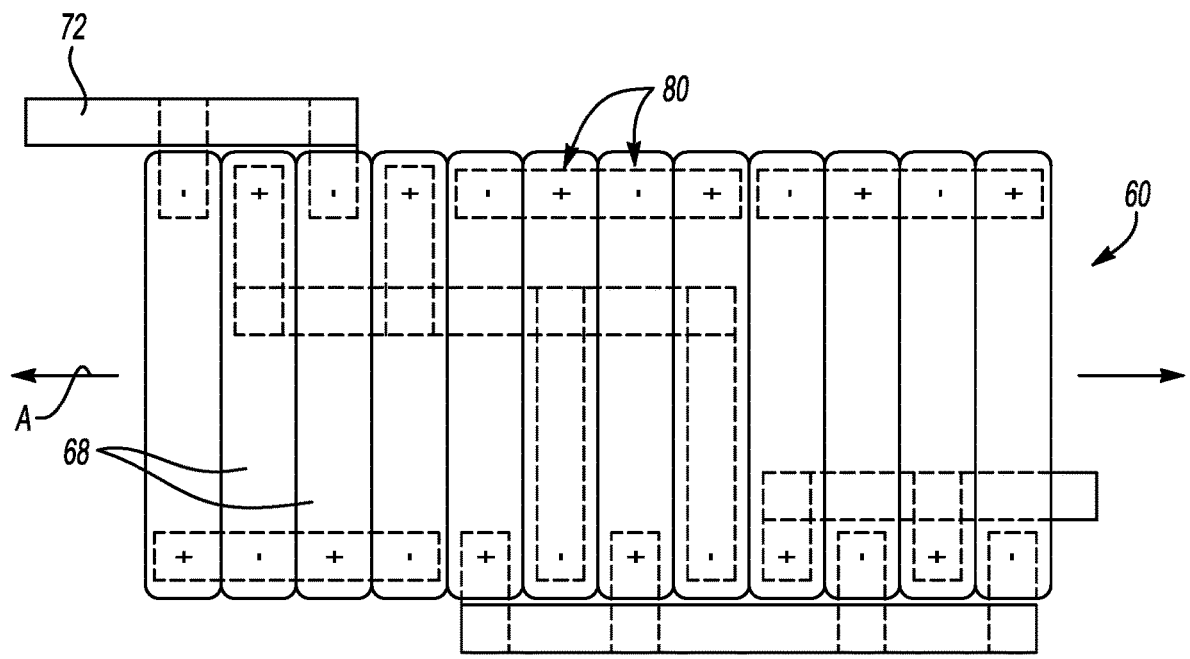
FIG. 3. illustrates selected portions of the battery assembly of FIG. 2 and shows a top view of a battery cell array electrically connected to busbars of a first busbar module.

With reference to FIG. 3, the battery cell array 60 is shown connected to the first arrangement 72 of busbars of the BBM 64. The battery cells 68 within the battery cell array 60 each include a positive "+" terminal 80 and a negative "−" terminal 80. The battery cells 68 are disposed along an axis A such that a positive terminal 80 of a first one of the battery cells 68 is directly adjacent a negative terminal of a second one of the battery cells 68. The first one of the battery cells 68 is directly adjacent the second one of the battery cells 68 within the battery cell array 60. The polarities of the battery cells 68 thus alternate.

In the prior art, battery cells within a battery cell array have the positive terminals of the battery cells next to each other, and the negative terminals of the battery cells next to each other. Arranging the battery cells 68 within the battery cell array 60 such that the polarities alternate can facilitate use of the battery cell array 60 being used with BBMs having different arrangements of busbars.

The BBM 64 is configured such that, when the first arrangement 72 of busbars of the BBM 64 is connected to the terminals 80, the battery cell array 60 is partitioned into six groups of individual battery cells. Each of the groups includes two individual battery cells 68 that are connected in parallel.

Figure 4:
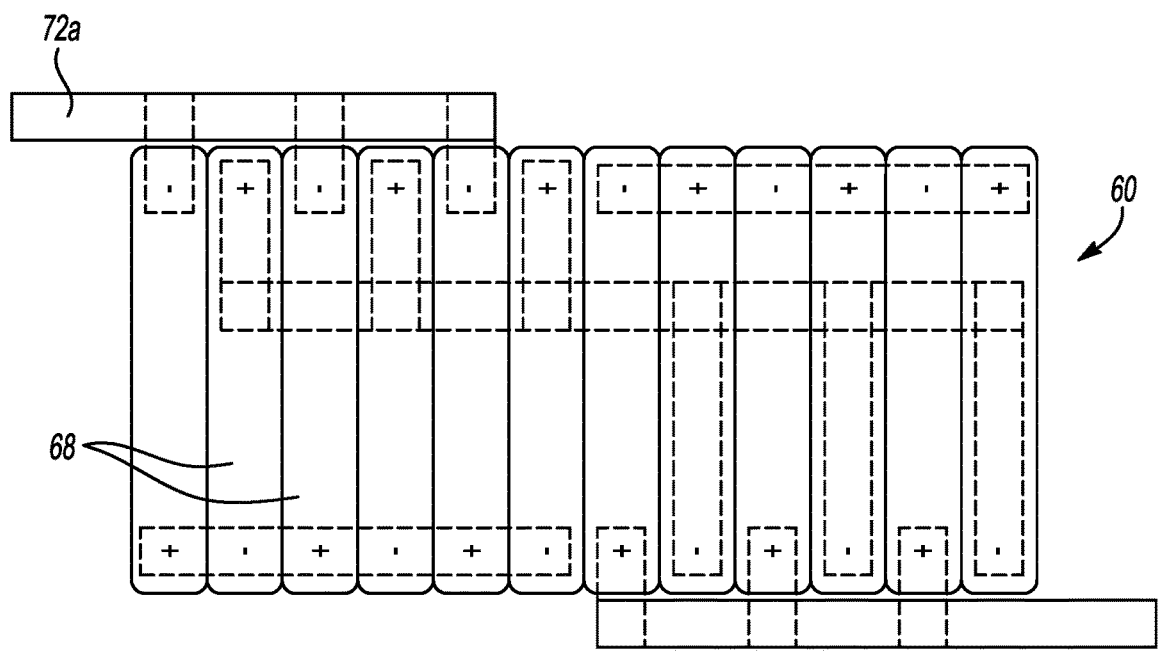
FIG. 4 illustrates the battery cell array of FIG. 3 electrically connected to busbars of a different, second busbar module.

With reference to FIG. 4, the same battery cell array 60 can be used with a second different BBM 64A, which has a second arrangement 72A of busbars. When the busbars of the second arrangement 72A are connected to the battery cells 68, the battery cell array 60 is partitioned into four groups of three individual battery cells 68 connected in parallel.

The first arrangement 72 of busbars within the BBM 64 is different than the second arrangement 72A of busbars within the BBM 64. These differences enable the BBM 64 to partition the battery cell array 60 into groups of two individual battery cells 68 connected in parallel, and the BBM 64A to partition the battery cell array 60 into groups of three individual battery cells 68 connected in parallel.

Figure 5A:
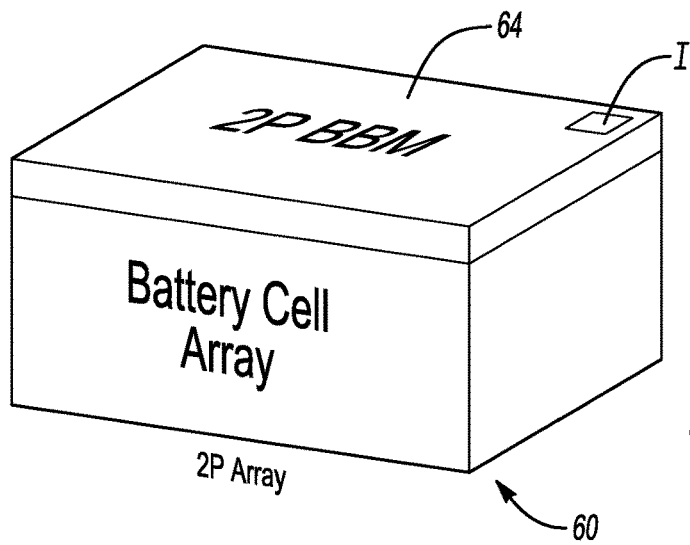
FIGS. 5A-5C illustrate the battery cell array of FIG. 3 electrically connected to different busbar modules to provide array variations having different numbers of individual battery cells connected in parallel.
Figure 5B:
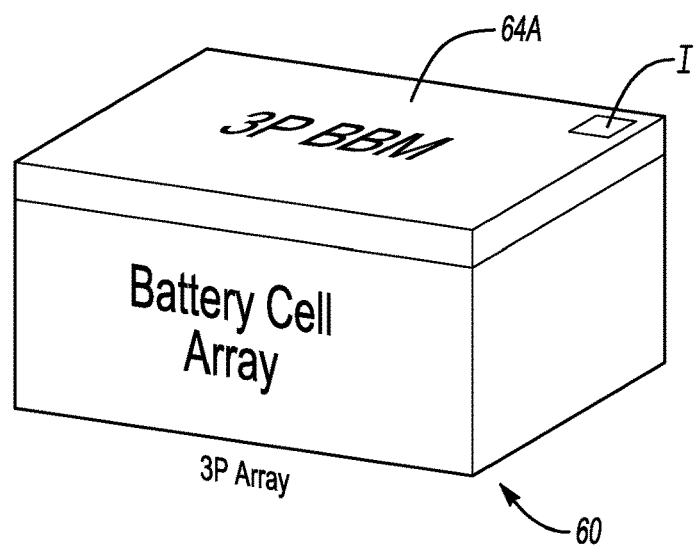
Figure 5C:
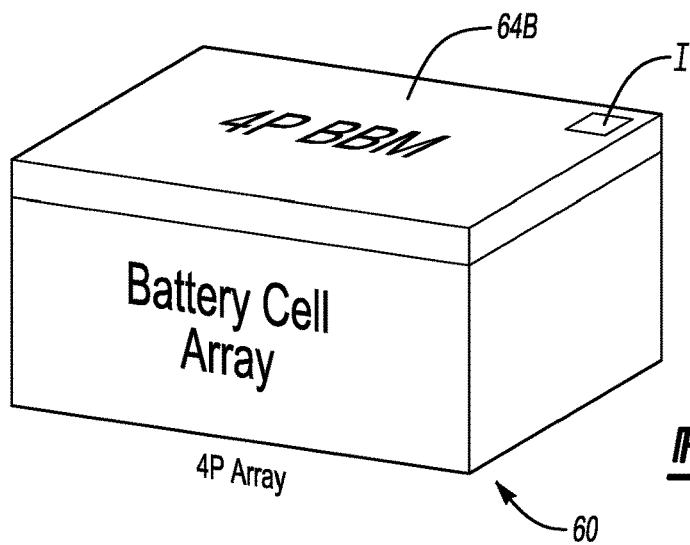

FIGS. 5A-5C, for example, shows the battery cell array 60 used with the BBM 64 to partition the battery cell array 60 into a 2P array, used with the BBM 64A to partition the battery cell array 60A into a 3P array, and used with a BBM 64B to partition the battery cell array 60B into a 4P array. The BBMs 64, 64A, 64B can include an identifier I such as a bar code such that, after the BBM is secured to the battery cell array 60, the configuration of battery cells 68 (i.e., 2P, 3P, 4P) can be easily identified. The same battery cell array 60 can be used with BBM 64, 64A, or 64B to provide the desired partitioning of the battery cell array 60.

Figure 6B:
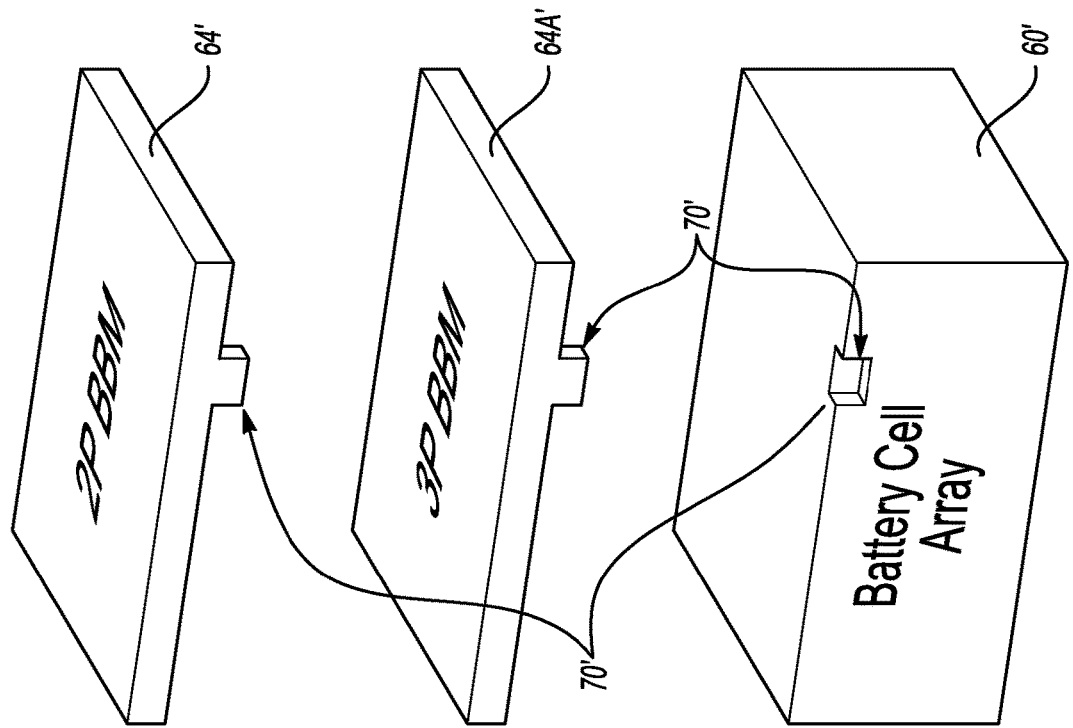
FIGS. 6A and 6B illustrate the battery cell array and selected busbar modules of FIGS. 5A-5C, which are of a first type, and additionally illustrate a battery cell array and busbar modules of a second type.
Figure 6A:
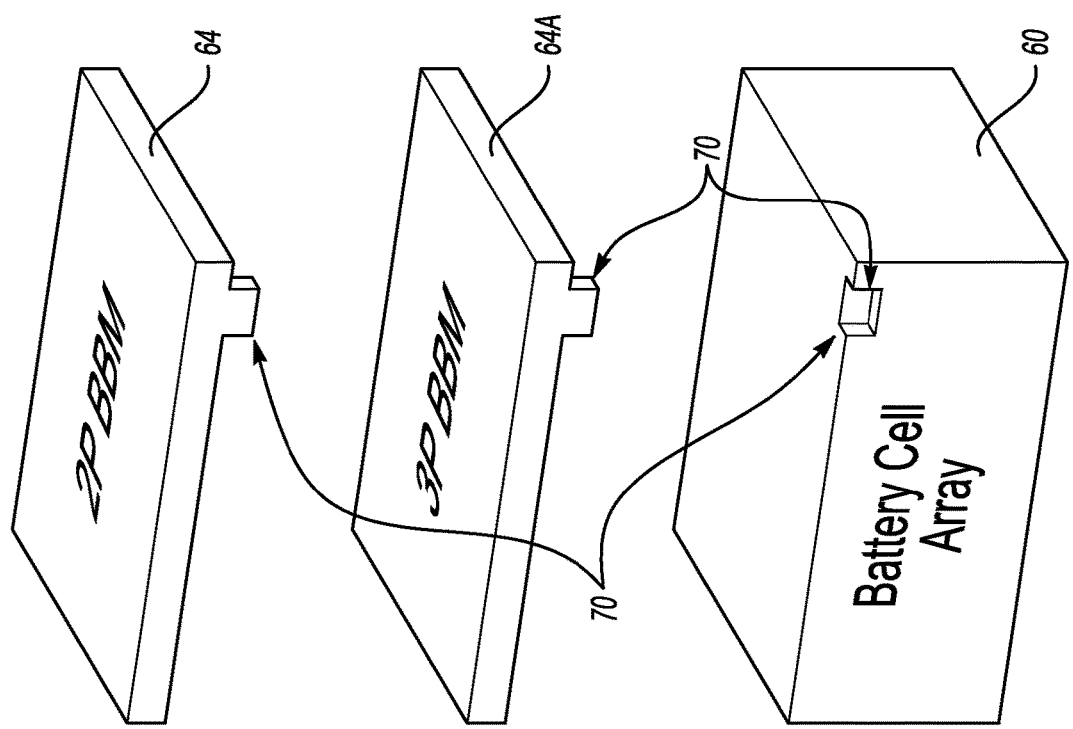
Figure 7A:
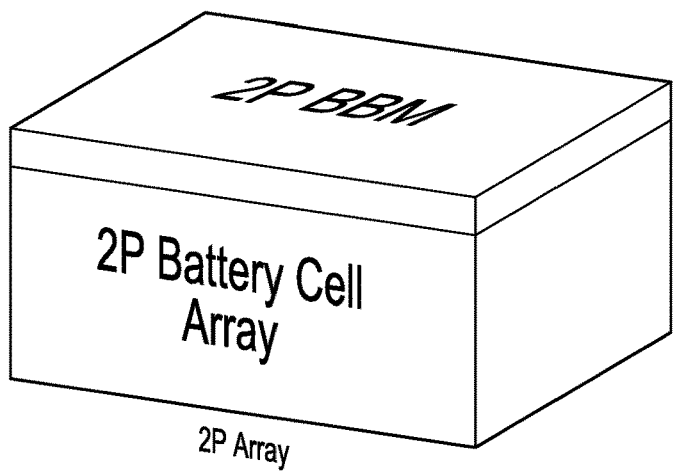
FIGS. 7A-7C illustrate prior art battery cell arrays electrically connected to prior art busbar modules to provide different numbers of individual battery cells connected in parallel.
Figure 7B:
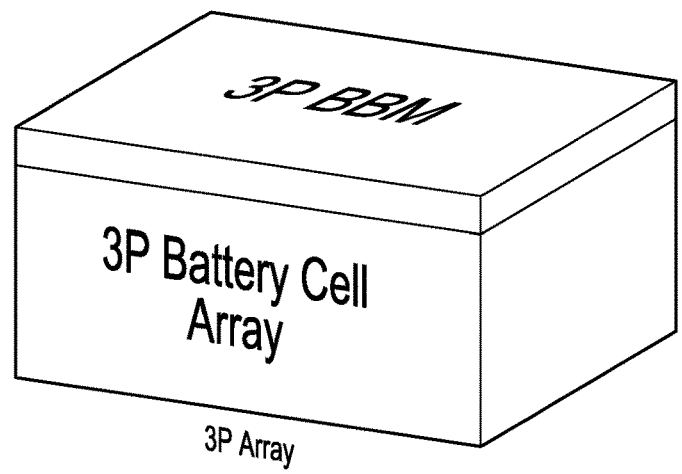
Figure 7C:
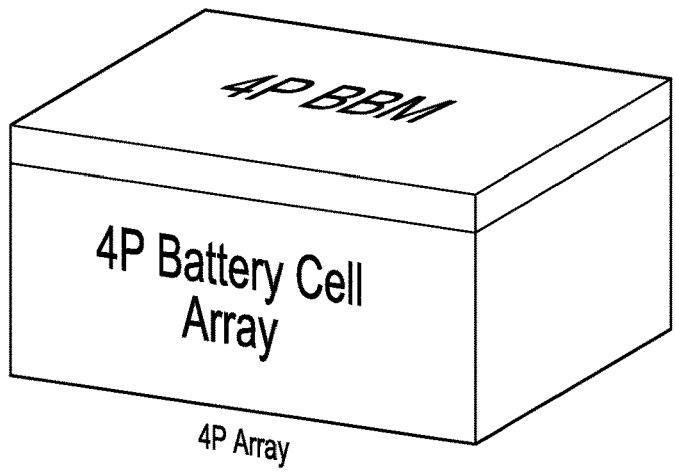

With reference to FIGS. 6A and 6B, the battery cell array 60 in the exemplary embodiment, is a first battery cell array 60 provided by a first manufacturer. A second battery cell array 60' is provided by a different, second manufacturer. Electrical parameters and other characteristics of the first battery cell array 60 can be different than the electrical parameters and other characteristics of the second battery cell array 60'. For example, the first battery cell array 60 can have a first Amp-hour and the second battery pack 60' can have a different, second Amp-hour rating.

In such examples, it may be desirable to connect the first battery pack 60 to one of the BBMs 64 or 64A, but not other BBMs 64' or 64A'. The BBMs 64 or 64A are a first type of BBM suitable for providing a 2P or 3P array with the battery cell array 60, but not the battery cell array 60'. The BBMs 64' or 64A' are a second type of BBM suitable for providing a 2P or 3P array with the battery cell array 60', but not the battery cell array 60.

First poke-yoke configurations 70 are incorporated into the battery cell array 60 and the BBM 64, and into the battery cell array 60 and the BBM 64A. The poke-yoke configurations 70 permit using the BBM 64 or the BBM 64A with the battery cell array 60, but block use of the BBM 64' or the BBM 64A' with the battery cell array 60.

Second poke-yoke configurations 70' are incorporated into the battery cell array 60' and the BBM 64', and into the battery cell array 60' and the BBM 64A'. The poke-yoke configurations 70' permit using the BBM 64' or the BBM 64A' with the battery cell array 60', but prevent using the BBM 64 or the BBM 64A with the battery cell array 60'.

In this example, the first poke-yoke configurations 70 each include a slot and a tab. Of course, other poke-yoke configurations could be used in other examples. The tabs are on the BBM 64 and the BBM 64A, and the slot is provided by the battery cell array 60. The BBMs 64 and 64A could each provide a slot and the battery cell array 60 could provide the tab. The slot and tab are positioned such that, when the BBM 64 or the BBM 64A is used with the battery cell array 60, the respective tab is received within the slot.

In this example, the second poke-yoke configurations 70' also each include a slot and a tab. Again, other poke-yoke configurations could be used in other examples. The tabs are on the BBM 64' and the BBM 64A', and the slot is provided by the battery cell array 60'. In another example, the BBMs 64' and 64A' could each provide a slot and the battery cell array 60' could provide the tab. The slot and tabs of the second poke-yoke configurations 70' are positioned such that, when the BBM 64' or the BBM 64A' is used with the battery cell array 60', the respective tab is received within the slot.

Notably, the tabs and slots of the first poke-yoke configurations 70 are located in a different position than the second poke-yoke configurations 70'. Thus, the tab of the BBM 64' could not be received within the slot of the battery cell array 60. The poke-yoke configurations 70 and 70' permit coupling of the BBM 64 or the BBM 64 to the battery cell array 60, but block coupling of the BBM 64' or the BBM 64A' to the battery cell array 60. The poke-yoke configurations 70 and 70' can thereby prevent incompatible combinations of BBMs and battery cell arrays.

The exemplary embodiment facilitates providing the battery cell array 60 as a commodity item that is mass produced without requiring significant customization for the number of battery cells 68 desired to be connected in parallel. The structural differences necessary to provide three individual battery cells 68 in parallel or two individual battery cells 68 in parallel can be substantially contained within the BBM 64 and the BBM 64A. This approach can reduce complexity when compared to prior art designs that require a particular type of battery cell array if a 2P configuration were desired and another type of battery cell array if a 3P configuration were desired.

In the exemplary embodiments, one BBM is used with one battery cell array. In other examples, the BBM can span more than one battery cell array. For example, the battery cell array 60 could be placed adjacent another battery cell array. Both battery cell arrays are then electrically connected through a single BBM.

The variations are disclosed above in connection with 2P, 3P, or 4P configurations. Other configurations are certainly possible and fall within the scope of this disclosure. 5P configurations could be utilized, for example.

Features of the disclosed examples include a common battery cell array that can be utilized with a particular busbar module to provide the desired electrical connections. This can reduce overall complexity when multiple array variations are required. Keeping the battery cell array common across the variation can, among other things, reduce costs and development time.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
a battery cell array having a plurality of battery cells, the battery cell array usable with a first busbar module having a first arrangement of busbars, the battery cell array usable with a second busbar module having a second arrangement of busbars,
wherein, when the battery cell array is used with the first busbar module, the battery cell array is partitioned into a first number of groups of battery cells in parallel with each other,
wherein, when the battery cell array is used with the second busbar module, the battery cell array is partitioned into a different, second number of groups of battery cells in parallel with each other.

2. The traction battery assembly of claim 1, wherein each group within the first number of groups includes a first number of battery cells in parallel, and each group within the second number of groups includes a second, different number of battery cells in parallel.

3. The traction battery assembly of claim 1, wherein each group within the first number of groups includes two battery cells in parallel, and each group within the second number of groups includes three battery cells in parallel.

4. The traction battery assembly of claim 1, wherein the first and second busbar modules each include a housing and a plurality of busbars.

5. The traction battery assembly of claim 1, wherein each of the battery cells within the battery cell array includes a positive terminal and a negative terminal, wherein a positive terminal of a first one of the battery cells within the battery cell array is directly adjacent a negative terminal of a second one of the battery cells, the first one of the battery cells directly adjacent the second one of the battery cells within the battery cell array.

6. The traction battery assembly of claim 1, wherein the plurality of battery cells are disposed along an axis.

7. The traction battery assembly of claim 1, wherein the battery cell array is usable with the first busbar module and the second busbar module without changing an orientation of the plurality of battery cells relative to each other.

8. The traction battery assembly of claim 1, wherein the plurality of battery cells each include terminals that are each electrically connected to busbars of the first arrangement of busbars when the battery cell array is used with the first busbar module.

9. The traction battery assembly of claim 8, wherein the terminals are welded to busbars of the first arrangement of busbars to electrically connect the terminals to the busbars.

10. The traction battery assembly of claim 8, wherein the terminals are spring biased against busbars of the first arrangement of busbars to electrically connect the terminals to the busbars.

11. The traction battery assembly of claim 1, further comprising a third busbar module, the third busbar module a different type of busbar module than the first and second busbar modules; and
a first poke-yoke configuration that permits coupling the first or the second busbar modules of the first type to the battery cell array, and that blocks coupling of the third busbar module to the battery cell array.

12. The traction battery assembly of claim 11, wherein the battery cell array is a first battery cell array that is a first type of battery cell array, and further comprising a second battery cell array of a second type that is different than the first type of battery cell array,
a second poke-yoke configuration that permits coupling the third busbar module to the second battery cell array, and that blocks coupling of the first and second busbar modules to the battery cell array.

13. A traction battery assembly, comprising:
a first busbar module having a first arrangement of busbars;
a second busbar module having a second arrangement of busbars; and
a battery cell array including a plurality of battery cells that are selectively electrically connected in a configuration selected from a group consisting of a first configuration using the first busbar module and a different, second configuration using the second busbar module.

14. The traction battery assembly of claim 13,
wherein, when the plurality of battery cells are electrically connected in the first configuration, the battery cell array is partitioned into a first number of groups of battery cells in parallel with each other,
wherein, when the plurality of battery cells are electrically connected in the second configuration, the battery cell assembly is partitioned into a different, second number of groups of battery cells in parallel with each other.

15. A traction battery assembly, comprising:
a battery cell array having a plurality of battery cells, the battery cell array usable with a first busbar module having a first arrangement of busbars, the battery cell array usable with a second busbar module having a second arrangement of busbars,
wherein each of the battery cells within the battery cell array includes a positive terminal and a negative terminal, wherein a positive terminal of a first one of the battery cells within the battery cell array is directly adjacent a negative terminal of a second one of the battery cells, the first one of the battery cells directly adjacent the second one of the battery cells within the battery cell array.

16. The traction battery assembly of claim 15,
wherein, when the battery cell array is used with the first busbar module, the battery cell array is partitioned into a first number of groups of battery cells in parallel with each other,
wherein, when the battery cell array is used with the second busbar module, the battery cell array is partitioned into a different, second number of groups of battery cells in parallel with each other.

17. The traction battery assembly of claim 1, wherein the battery cell array has a number of battery cells when used with the first busbar module and the same number of battery cells when used with the second busbar module.

18. The traction battery assembly of claim 1,
wherein, when the battery cell array is used with the first busbar module, a number of battery cells within the battery array are electrically coupled to the first busbar module, and
wherein, wherein the battery cells arrays used with the second busbar module, the same number of battery cells are electrically connected to the second busbar module.

19. The traction battery assembly of claim 13, wherein a number of battery cells electrically connected in the first configuration is the same as a number of battery cells electrically connected in the second configuration.

20. The traction battery assembly of claim 13, wherein the busbar module electrically connects to a number of battery cells when in the first configuration, and the second busbar module electrically connects to the same number of battery cells when in the second configuration.

* * * * *